(12) United States Patent
Sato

(10) Patent No.: US 6,781,718 B2
(45) Date of Patent: Aug. 24, 2004

(54) IMAGE CORRECTION METHOD AND IMAGE CORRECTING APPARATUS

(75) Inventor: Kazuhiko Sato, Minato (JP)

(73) Assignee: Fuji Xerox Co., Ltd., Tokyo (JP)

(*) Notice: Subject to any disclaimer, the term of this patent is extended or adjusted under 35 U.S.C. 154(b) by 145 days.

(21) Appl. No.: 10/230,984

(22) Filed: Aug. 30, 2002

(65) Prior Publication Data

US 2003/0007166 A1 Jan. 9, 2003

Related U.S. Application Data

(63) Continuation of application No. PCT/JP00/01243, filed on Mar. 2, 2000.

(51) Int. Cl.[7] .............................. H04N 1/409; G06T 5/00
(52) U.S. Cl. ........................ 358/1.9; 358/3.26; 382/205; 382/216; 382/218; 382/269
(58) Field of Search ................................ 358/1.9, 3.26, 358/3.27; 382/205, 199, 217, 218, 209, 266, 269, 216, 264

(56) References Cited

U.S. PATENT DOCUMENTS

| | | | | |
|---|---|---|---|---|
| 5,249,242 A | * | 9/1993 | Hanson et al. | 382/269 |
| 5,627,915 A | * | 5/1997 | Rosser et al. | 382/219 |
| 5,650,858 A | * | 7/1997 | Lund | 358/3.15 |
| 5,687,297 A | * | 11/1997 | Coonan et al. | 382/209 |
| 6,075,894 A | * | 6/2000 | Yano et al. | 382/199 |
| 6,330,077 B1 | | 12/2001 | Sato et al. | |
| 6,577,774 B1 | * | 6/2003 | Asada | 382/218 |

FOREIGN PATENT DOCUMENTS

| | | |
|---|---|---|
| EP | 0854636 | 7/1998 |
| JP | 06195457 A | 7/1994 |
| JP | 7-205483 | 8/1995 |
| JP | 10145602 A | 5/1998 |
| JP | 11-216910 | 8/1999 |

OTHER PUBLICATIONS

Gavrila, D. M. et al, "Fast correlation matching in large (edge) image databases", SPIE vol. 2368 (1994), pp. 104–116.*

* cited by examiner

*Primary Examiner*—Scott Rogers
(74) *Attorney, Agent, or Firm*—Westerman, Hattori, Daniels & Adrian, LLP

(57) ABSTRACT

An image correcting method and apparatus is disclosed in which processing other than a smoothing process can be performed in accordance with conditions of a line such as correction of a line width with a small circuit size and at low cost. The disclosed dot image correcting method stores correction data corresponding to a correction dot pattern(s) in a window(s), determines whether or not a dot pattern coincides with a correction dot pattern, and when coincidence is detected, performs correction in accordance with corresponding correction data, characterized in that there are a plurality of windows, and correction data are stored corresponding to a combination of correction dot patterns in various windows, and determination is made as to whether or not dot patterns in a plurality of windows coincide with a combination of correction dot patterns in various windows, and when coincidence is detected, correction is performed in accordance with corresponding correction data.

10 Claims, 13 Drawing Sheets

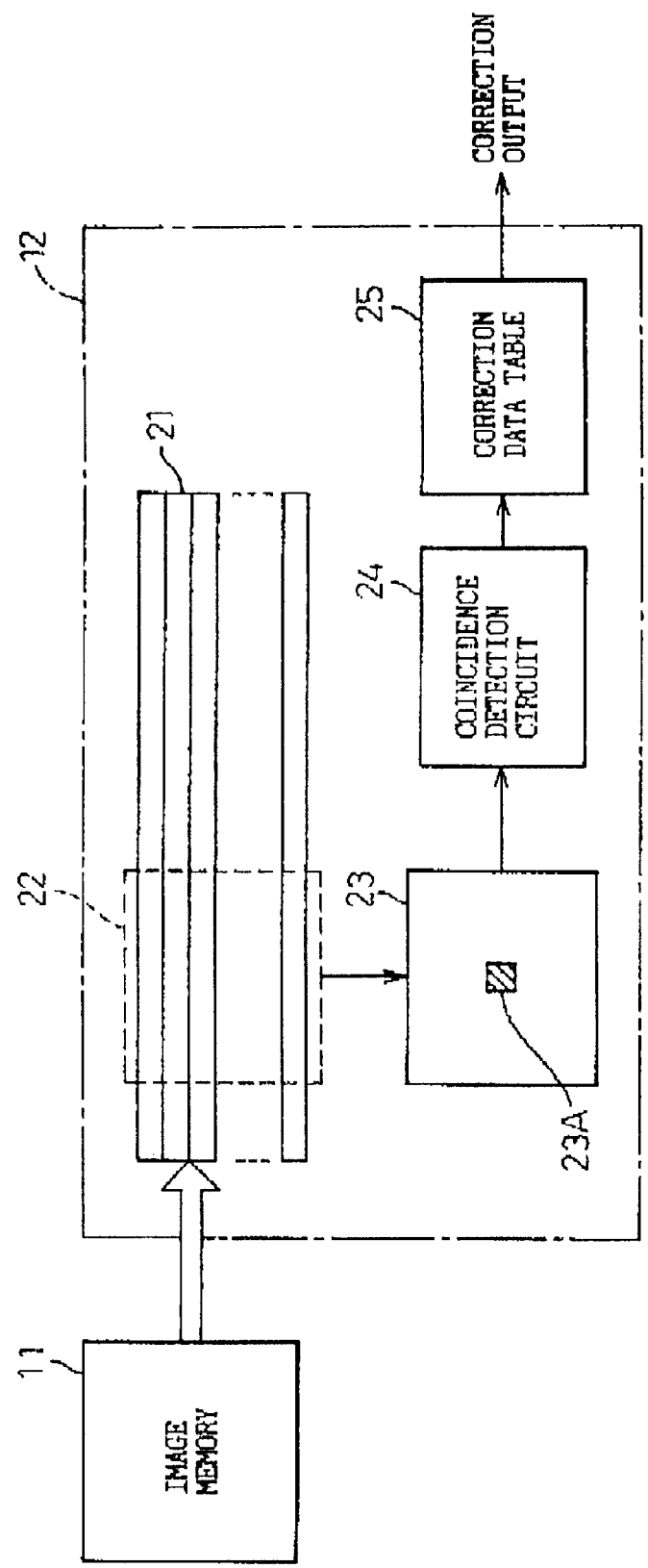

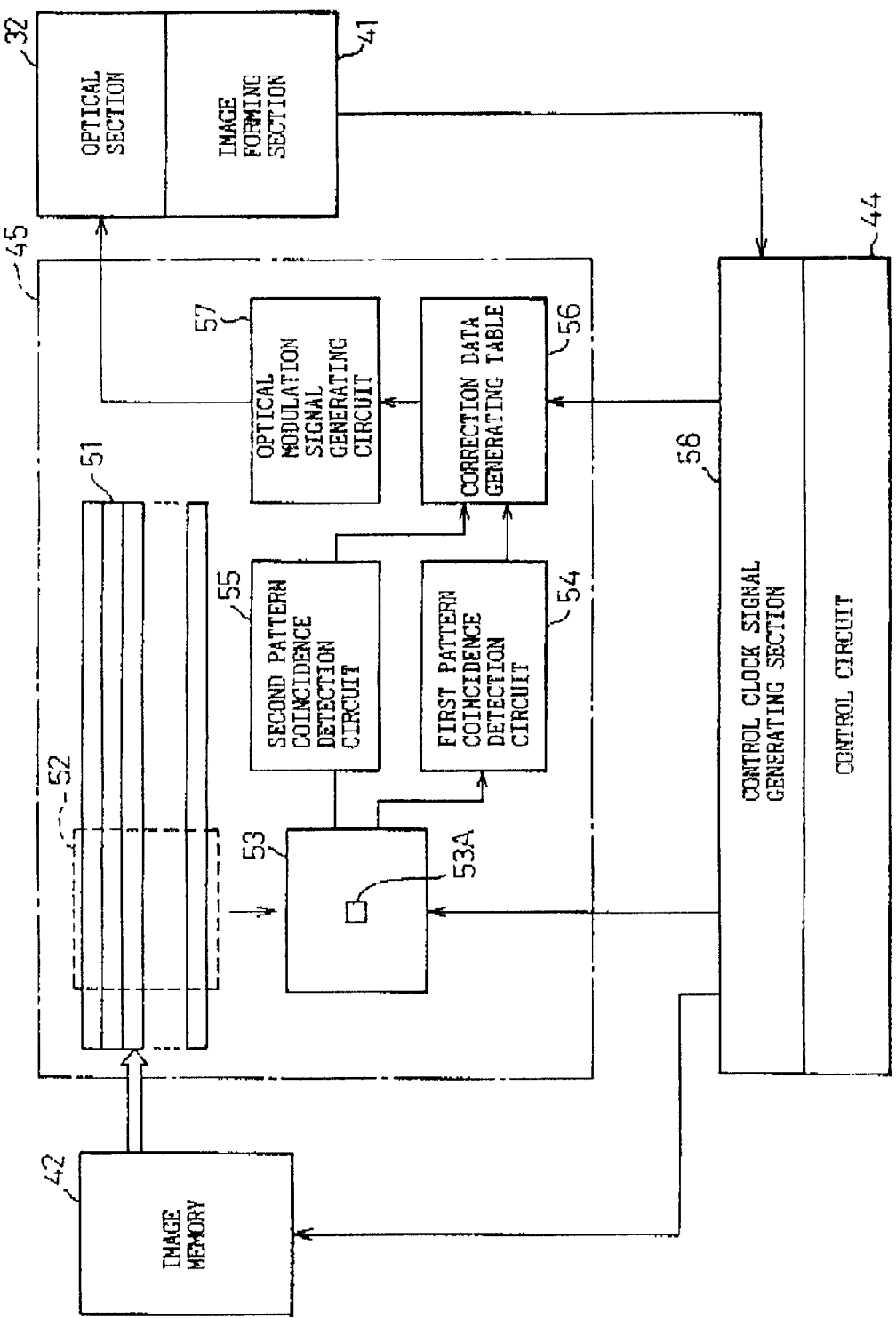

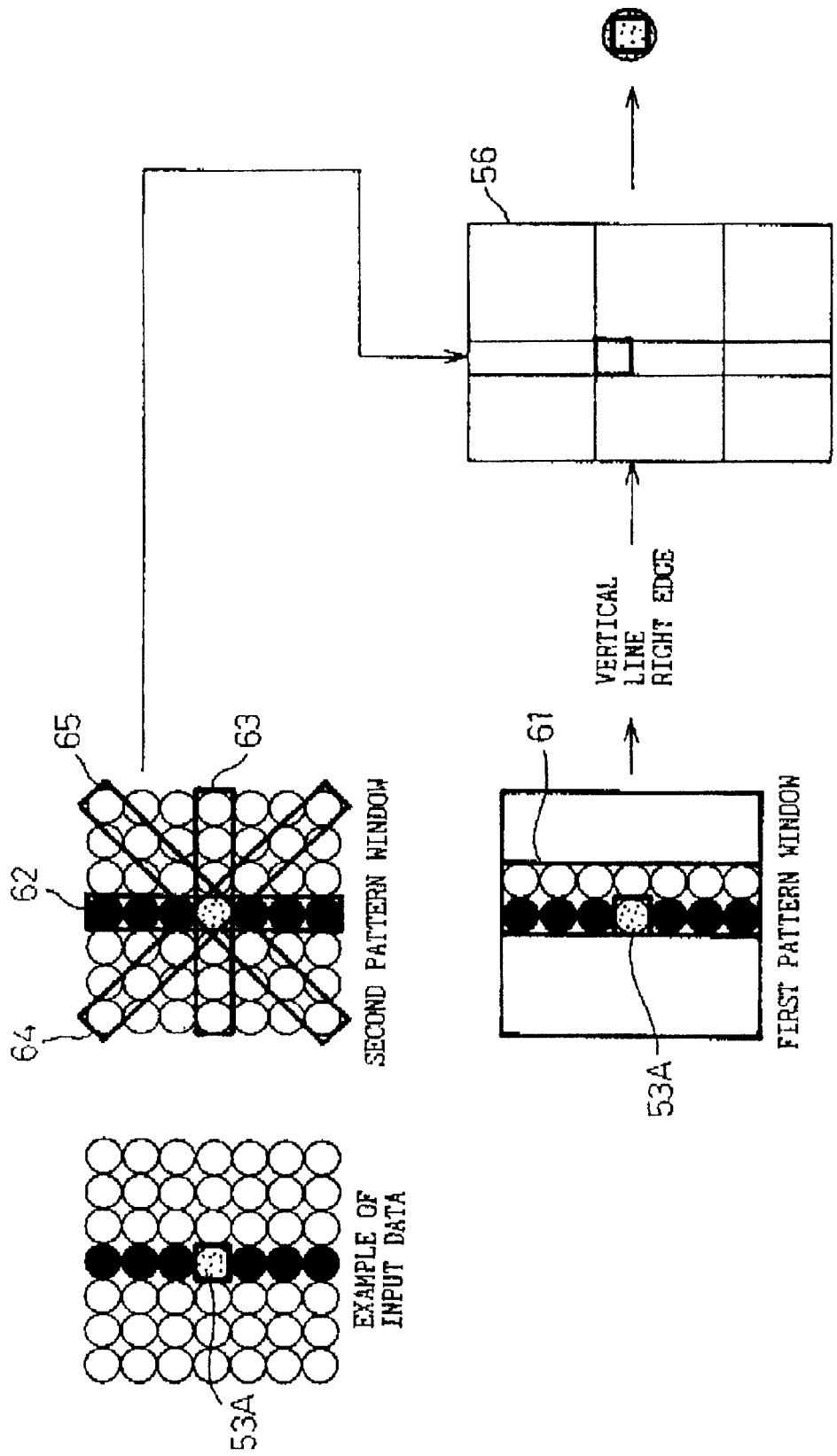

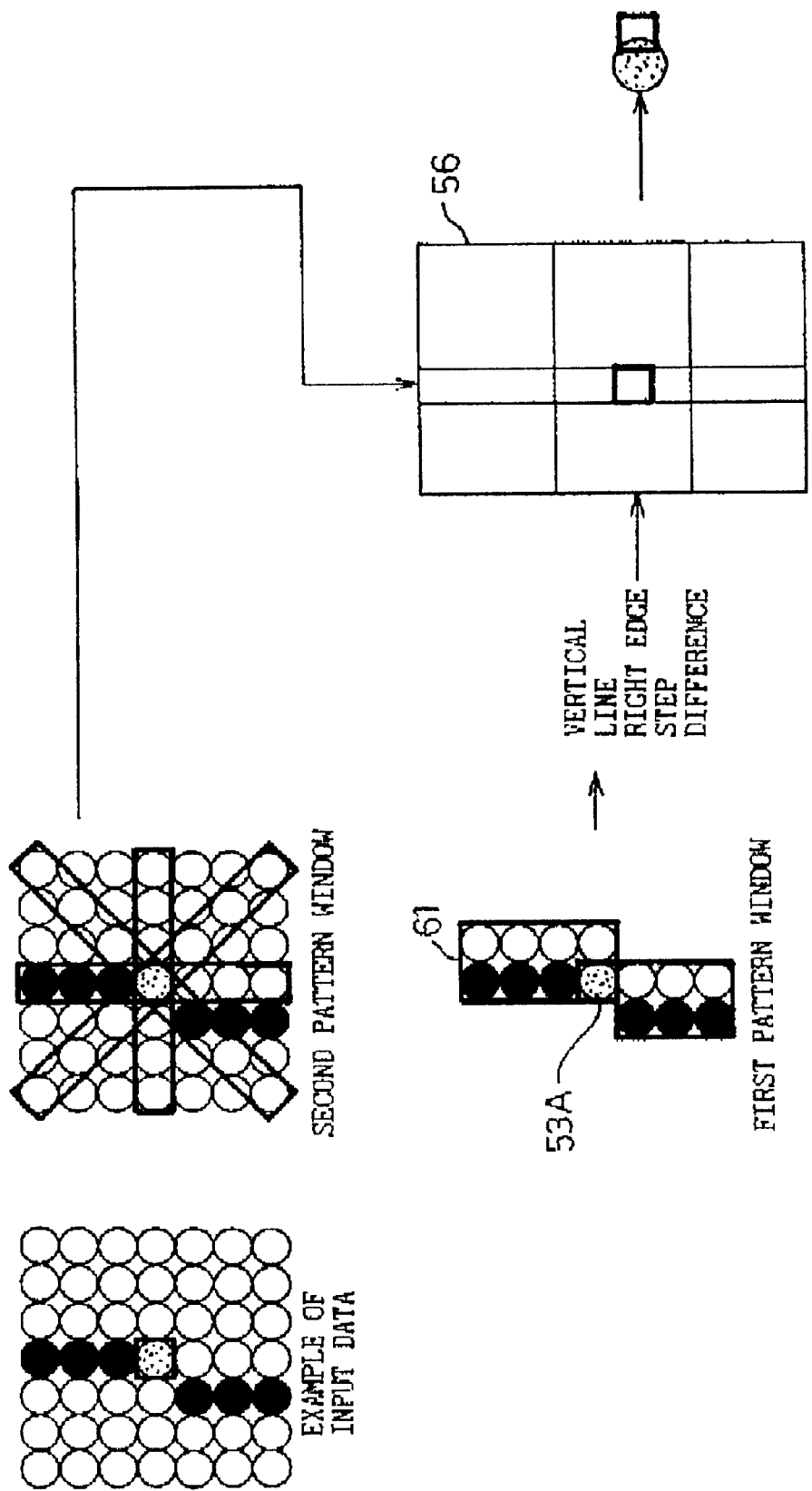

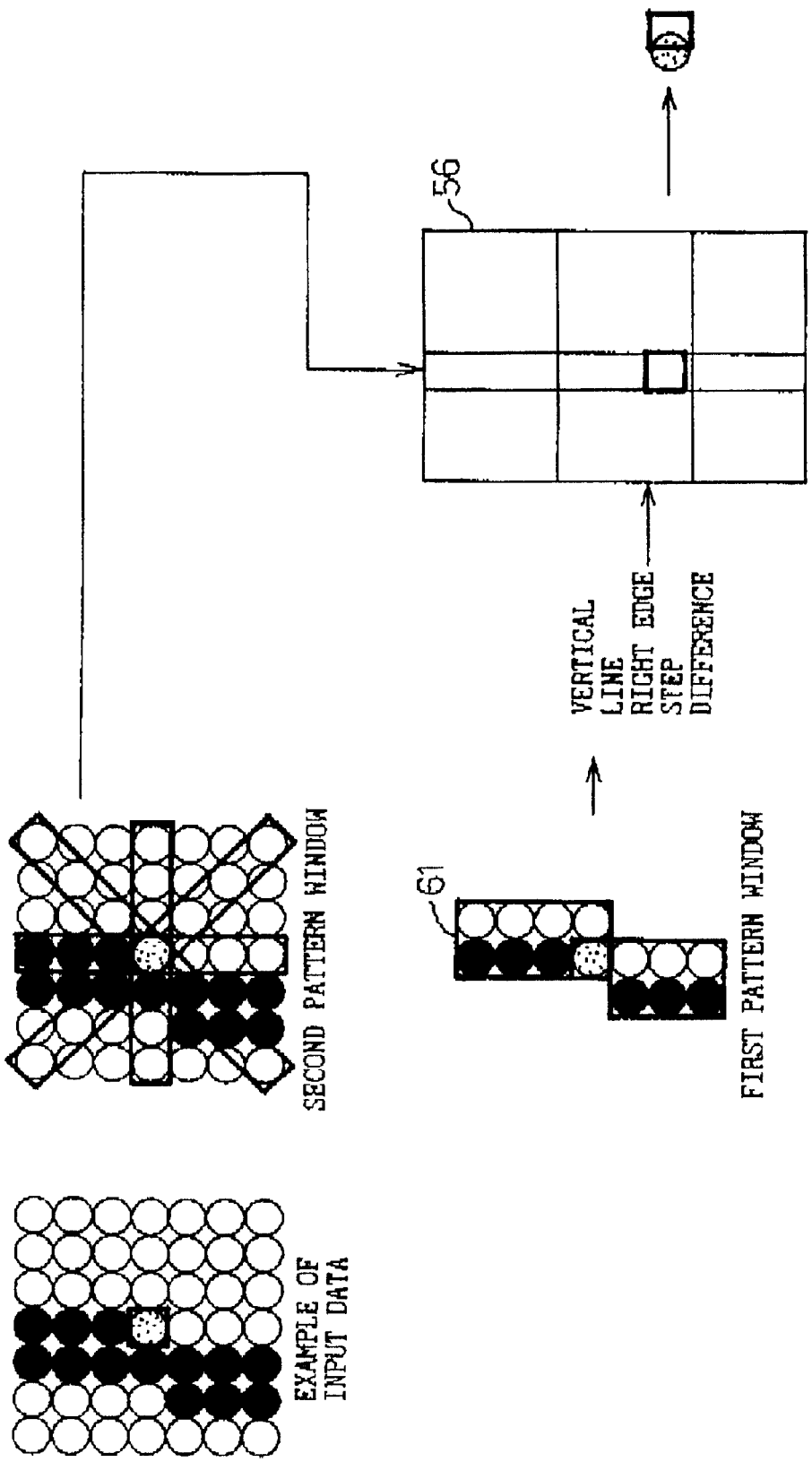

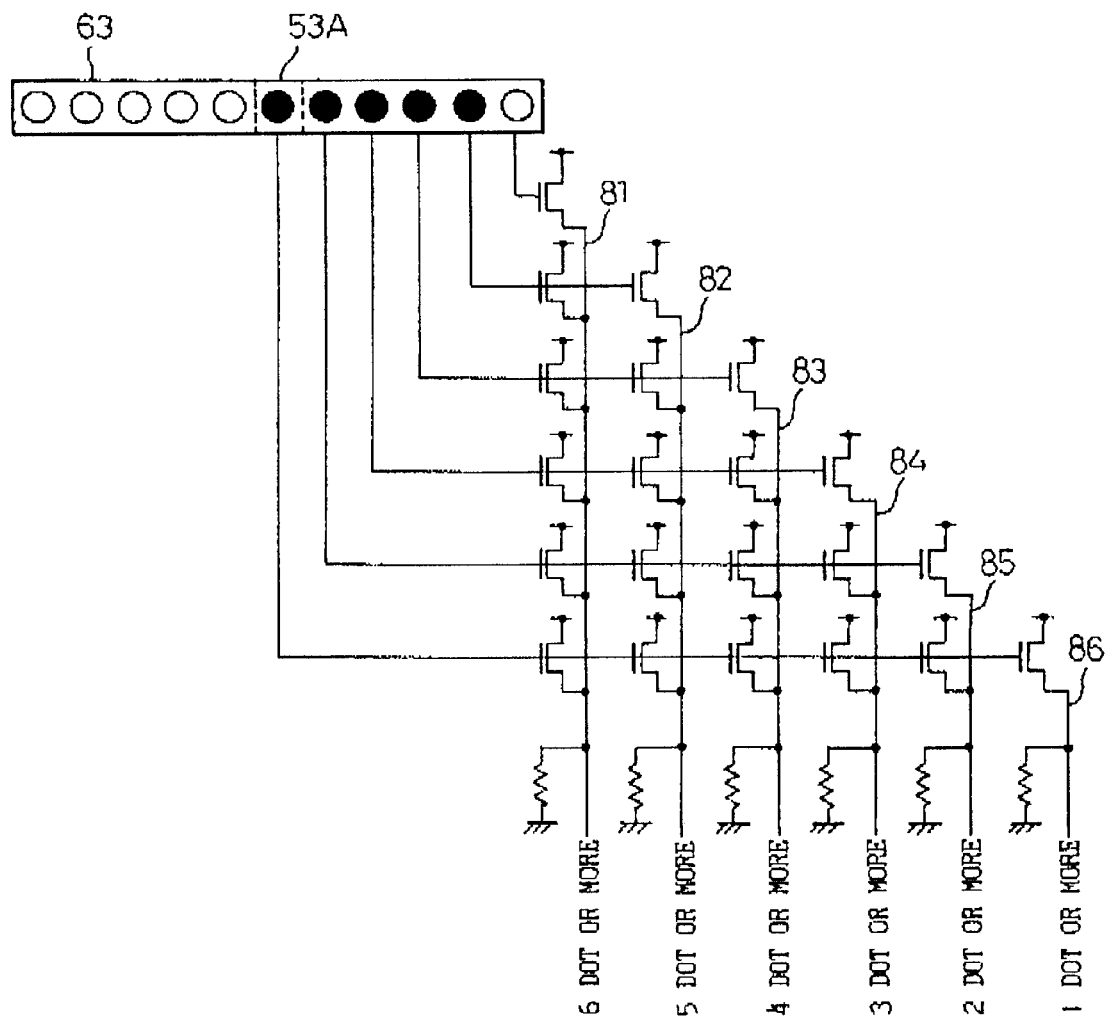

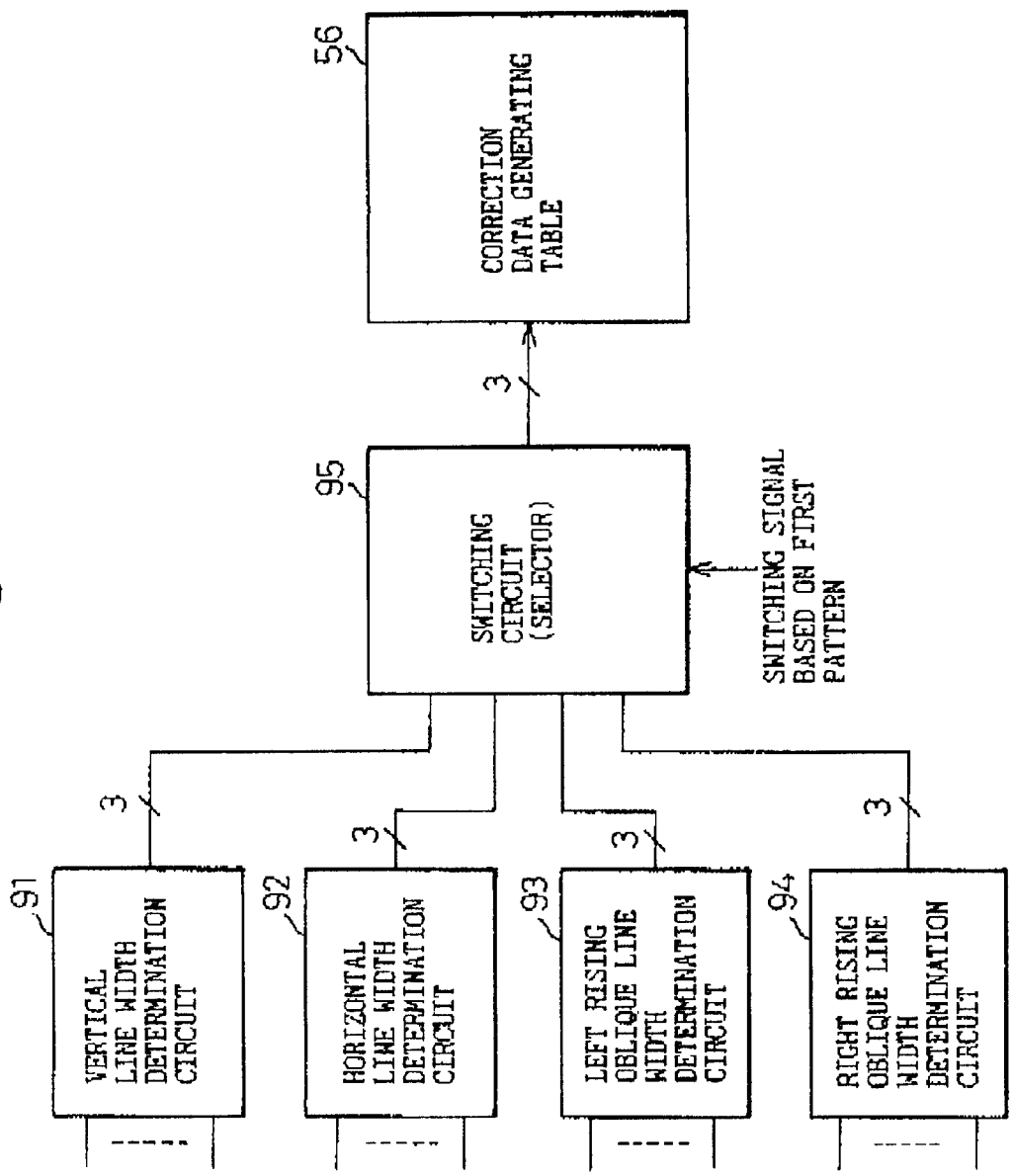

IMAGE CORRECTION METHOD AND IMAGE CORRECTING APPARATUS

This application is a continuation of International Application No. PCT/JP00/01243, filed on Mar. 2, 2000, which International Application was published by the International Bureau, in Japanese, on Sep. 7, 2001.

FIELD OF THE INVENTION

The present invention relates to an image correcting method and an image correcting apparatus for improving the quality of a dot printed image in an image forming apparatus such as a printer and, more particularly, to a dot image correcting method, and apparatus, which stores correction data corresponding to a correction dot pattern in a window, detects while scanning a dot image whether or not the dot pattern in the window coincides with the correction dot pattern, and if the coincidence is detected, corrects the dot image in accordance with the correction data.

DESCRIPTION OF THE RELATED ART

In a digital printer such as a laser beam printer, or in a display such as a liquid crystal display, CRT or the like, an image is formed with dots. Usually, the positions of the dots and the dot diameters are controlled so as to remain approximately constant. However, when an oblique line is printed in a dot image, a step called a jaggy appears at the edge portion, and a processing called a smoothing process is performed by detecting a jaggy edge portion in a dot image and correcting the edge portion so as to change smoothly, FIG. 1 is a view showing the construction of a dot image correcting apparatus for performing the above-described correction. In FIG. 1, reference number 11 denotes an image memory for storing dot image data, and 12 denotes a dot image correcting apparatus. The dot image correcting apparatus 12 comprises, as shown in the Figure, a line buffer 21 that temporarily stores dot image data for a few lines which are stored in the image memory 11, a window register 23 for storing the window portion denoted by reference numeral 22, a coincidence detection circuit 24 that detects whether or not the dot pattern in the window register 23 coincides with a preset correction dot pattern, and a correction data table 25 that stores correction data corresponding to the correction dot pattern and outputs the correction data in accordance with the coincidence detection result from the coincidence detection circuit 24.

The line buffer 21 has the memory capacity for storing image data for a few lines, sequentially stores image data read from the image memory 11, and successively shifts the range of lines to be stored. The window register 23 temporarily stores data for each dot from the line buffer 21 in the range where comparison of the dot pattern is performed, and outputs them to the coincidence detection circuit 24. When the comparison in the coincidence detection circuit 24 has been done, the window register 23 shifts the position of the window to the right by one dot. This operation is repeated from the left end to the right end of the line buffer 21, and when completed, the line buffer 21 erases the image data for the top line and stores the image data for the next line anew. Reference number 23A denotes the dot at the center of the window 23, and this dot is referred to as an observation dot. In other words, the position of the observation dot 23A is successively scanned on the image to detect coincidence with the correction dot pattern. Correction data indicate how to correct the observation dot 23A.

FIGS. 2A and 2B are views showing the correcting method for correcting a jaggy. As shown in FIG. 2A, a jaggy occurs at the dot denoted by reference number 27. In this case, the dot 27 is shifted to the left by half pitch, the dot above the dot 27 is shifted to the left by an amount less than half pitch, and the dot beneath the dot 27 is shifted to the right by an amount less than half pitch. Shifting the position of a dot is performed, for example, in the case of a laser beam printer, by shifting the modulating signal of the laser, There is a case where the coincidence of a pattern is not detected, and pattern recognition is performed by processing the dot pattern in the window register 23 with an operation circuit 26 to obtain correction data. In such a construction, however, there is a problem that, as the pattern is stored in the operation circuit 26 to detect the coincidence, size of the operation circuit becomes large and requires longer time for operation.

FIG. 4 is a view showing an example of the construction of the window register 23 and the coincidence detection circuit 24 and the correction data table 25 of FIG. 1. The coincidence detection circuit is well known and, therefore, a detailed explanation thereof is omitted, Basically, a signal line in which signal indicating the value of each dot is output is taken out from the window register 23, and is arranged in parallel in the coincidence detection circuit 24 so as to form a first wiring array. A second wiring array with number of lines corresponding to the number of correction dot patterns is formed so as to intersect the first wiring array. In each signal line of the second wiring array, a gate is provided at the intersection corresponding to each correction data pattern, When a dot pattern output from the window register 23 coincides with correction dot pattern of a second wiring, only the output from the wiring is modified and the correction data register 251 storing the corresponding correction data is activated to output the correction data via a selector 252. When there is no coincident correction dot pattern, no correction data register 251 is activated, and therefore no correction data is output. In practice, another signal line is provided for each signal line of the first wiring array, and an inverted signal is applied to this signal line. One of this set of signal lines is connected to the gate of the transistor connected to each signal line of the second wiring array. When the transistor is connected to a high potential, each signal line of the second wiring array is connected to ground via a resistor.

Japanese Unexamined Patent Publication (Kokai) No. 07-205483 discloses an image processing method and apparatus wherein a smoothing process is performed efficiently at high speed by the primary detection of an edge corner and by computing the number of continuous dots extending vertically and horizontally from the primary detection point as starting point to perform correction processing. However, this patent publication discloses only a smoothing process and does not disclose correction of any portion other than jagged portions, nor disclose correction of line width as described later.

Conventionally, only a smoothing process has been performed. However, with recent advances in the performance of an image forming apparatus such as a printer, an improvement in image quality by performing correction processes other than the smoothing process is being increasingly required, In particular, more precise control of the size and position of a dot, than has been possible before, is required for such a repeating pattern as a single thin line, an outlined thin line, a repetition of thin line, and so forth. In the case of an isolated thin line, for example, processing for increasing line width is performed because a printing process may adversely affect the visibility of the line, Thus, in the case of a black line of 1 dot, correction is performed so as to increase the dot diameter, and in the case of white line of 1 dot, correction is performed so as to decrease the dot diameter on both sides of the line. This correction is performed by varying the width of the modulation signal in the case of a laser printer, and by varying the amount of ink in the case of an ink jet printer. In such a case, an isolated thin line is stored as a correction dot pattern and, by comparison with a dot pattern in the window, it is detected whether or not the dot pattern is an isolated thin line.

Japanese Unexamined Patent Publication (Kokai) No. 11-216910 discloses an image forming apparatus which corrects a dot diameter in accordance with a dot pattern. Also in this case, coincidence with the correction dot pattern needs to be detected, and the same coincidence detection circuit as shown in FIG. 4 is used for this purpose.

In order to determine which of the black pattern or the white pattern is to be emphasized at the edge portion of an image, it is necessary to detect whether the pattern is a black-in-white pattern or a outlined white-in-black pattern, and to perform a suitable correction processing accordingly. In this case, a respective correction dot pattern is required so that the number of correction patterns becomes very large.

FIGS. 5A to 5L are views showing examples of necessary correction dot pattern, and show only those correction dot patterns associated with a vertical line. Thus, similar correction dot patterns are necessary for a horizontal line and for an oblique line. If these correction dot patterns are added, the number of correction dot patterns is increased to about ten times as large as when only detection of jaggy portion is performed. In order to be able to accommodate various line widths, it is necessary that the size of the window register is increased and number of dots is also increased. For example, if only jaggy portion needs to be detected, the window register may be 3×3 or 5×5. But, if correction of line width as described above is also to be performed, a window register of size 7×7 or greater must be used, leading to a correction apparatus with a very large-size circuit, and giving rise therefore to the problem of increased cost.

DISCLOSURE OF THE INVENTION

It is an object of the present invention to realize an image correcting method and apparatus that is capable of performing, in addition to a smoothing process correction processing of line width correction in accordance with the condition of the lines, using a small-size circuit and at low cost.

To attain the above-described object, an image correcting method and apparatus of the present invention performs the coincidence detection using a plurality of windows of different shapes, and obtains correction data by synthesizing the result of the coincidence detection.

Thus, the image correcting method of the present invention is a dot image correcting method in which correction data corresponding to correction dot patterns in a window are stored and a determination is made as to whether or not a dot pattern in a window of a dot image coincides with a correction dot pattern and, if the coincidence is detected, correction is performed in accordance with the corresponding correction data, characterized in that there are plural windows and correction data are stored corresponding to a combination of correction dot patterns in various windows, and that coincidence of dot patterns in the plural windows with the combination of the correction dot patterns in various windows is determined, and that, when coincidence is detected, correction is performed in accordance with the corresponding correction data.

The image correcting apparatus of the present invention is a dot image correcting apparatus comprising a correction data storage circuit that stores correction data corresponding to a correction dot pattern in a window, a pattern coincidence detection circuit that detects whether or not a dot pattern in a window of a dot image coincides with a correction dot pattern, and a correction signal generating circuit that performs correction in accordance with the corresponding correction data when coincidence is detected, characterized in that there are plural windows, and that the correction data storage circuit stores correction data corresponding to a combination of correction dot patterns in various windows, and that the pattern coincidence detection circuit comprises a plurality of pattern coincidence detection circuits for detecting whether or not dot patterns in the plural windows coincide with a combination of correction dot patterns.

In accordance with the image correcting method and apparatus of the present invention, plural windows of different shapes are used to share the function of recognizing a dot pattern so that various patterns can be efficiently distinguished using a small-size circuit. For example, by selecting windows such that one of the windows is a conventional small square window and other windows are vertically, horizontally and obliquely elongated windows, respectively, the pattern can be distinguished using the small square window and the line width can be distinguished using the elongated windows, and these results can be synthesized to distinguish the dot pattern. In this way, each of the windows can be made small and, even after combining them all, the overall size of the circuit can be made small, The elongated windows may be combined into one window spreading radially from an observation dot.

Plural windows are set respectively so as to include a common observation dot, and the correction data are data for correcting this observation dot.

BRIEF DESCRIPTION OF THE DRAWINGS

FIG. 1 is a view showing the construction of a conventional dot image correcting apparatus;

FIG. 7 is a view showing the construction of an image correcting apparatus according to an embodiment of the present invention;

FIG. 8 is a view illustrating the detection of an isolated vertical line according to the embodiment;

FIG. 9 is a view illustrating the detection of a jaggy in a one-dot vertical line according to the embodiment;

FIG. 10 is a view illustrating the detection of a jaggy in a two-dot vertical line according to the embodiment;

FIG. 11 is a view showing an example of the construction of a line width detection circuit in the embodiment;

FIG. 12 is a view showing the construction in which line widths, in various directions, are selectively used in the embodiment;

BEST EMBODIMENTS OF THE INVENTION

Now, the present invention will be described below with respect to an embodiment in which the invention is applied to image data printed by a laser beam printer so as to improve the quality of the printed image.

Figure 2A:
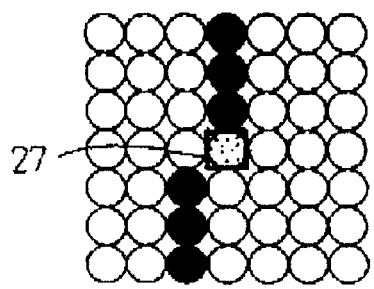
FIGS. 2A and 2B are views useful for explaining the smoothing process.
Figure 2B:
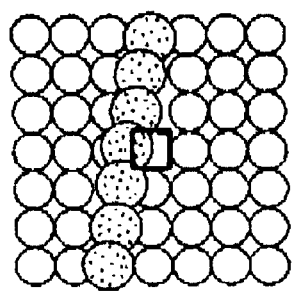
Figure 3:
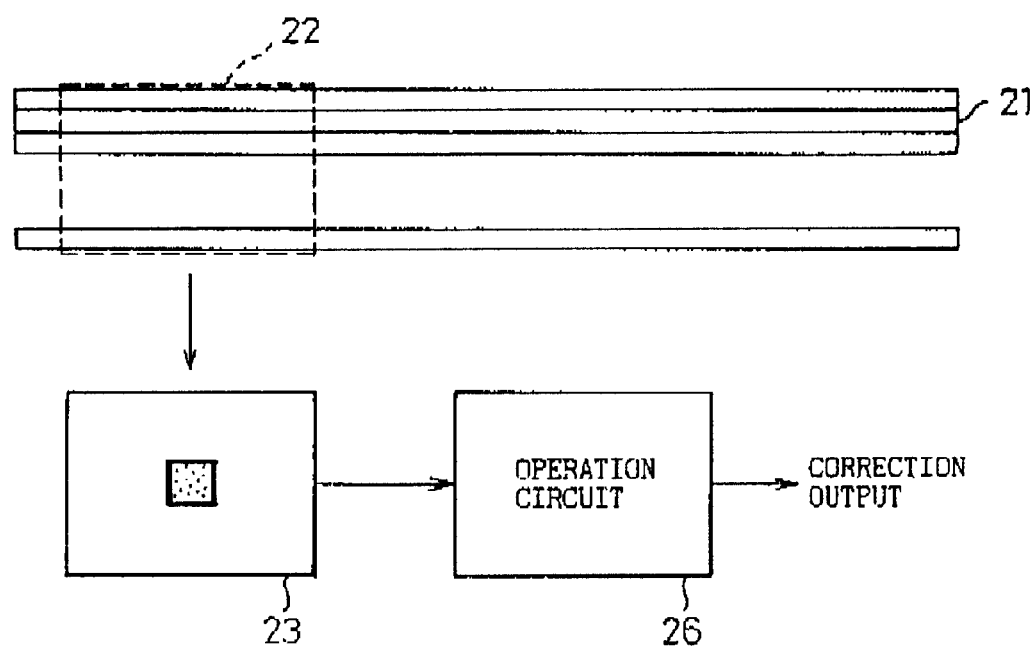
FIG. 3 is a view showing another construction of a conventional dot image correcting apparatus.
Figure 4:
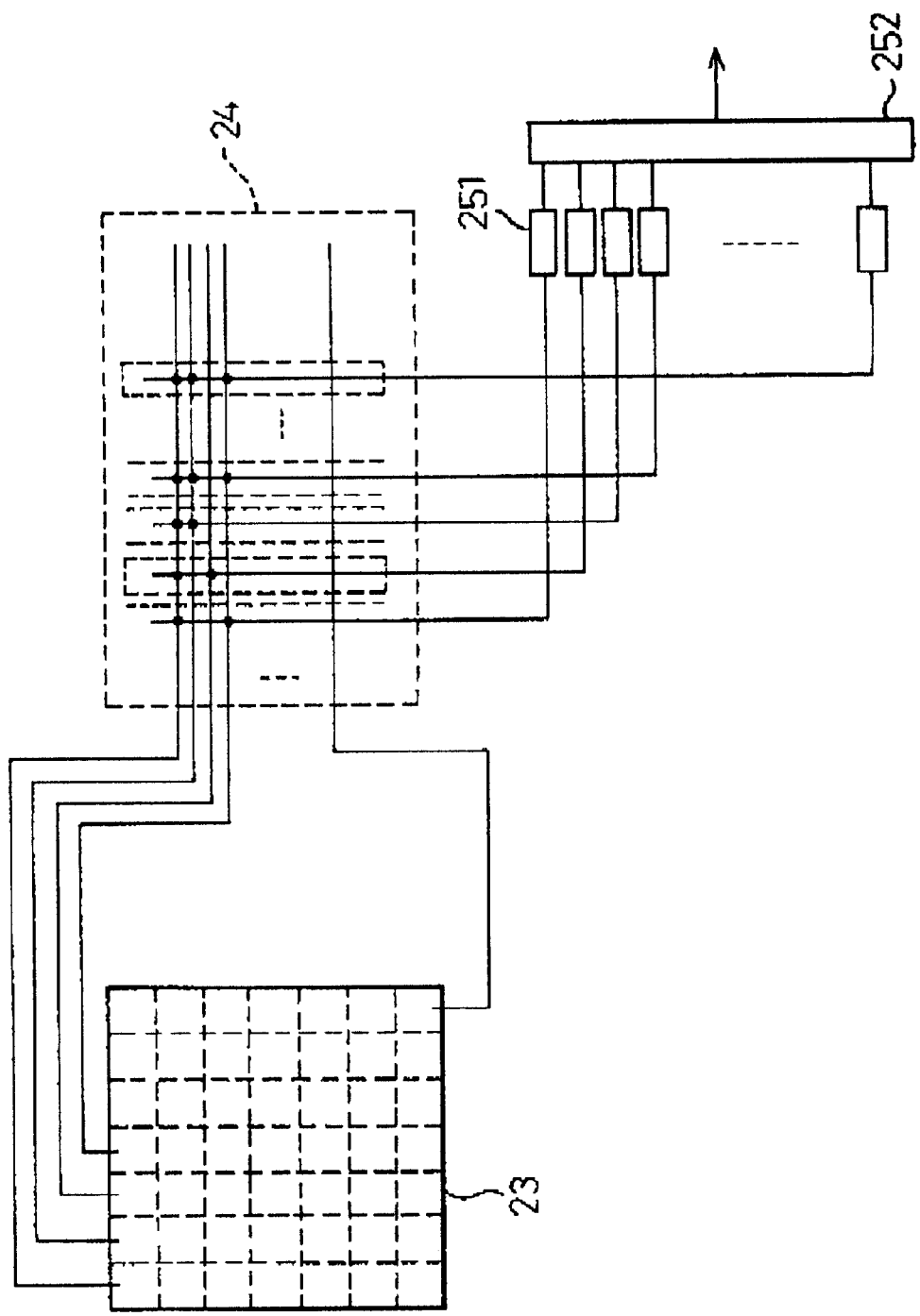
FIG. 4 is a view showing the circuit construction of the dot image correcting apparatus of FIG. 1.
Figure 5A:
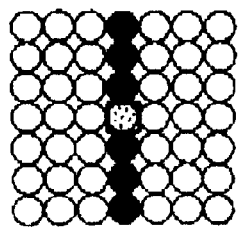
FIGS. 5A to 5L are views showing examples of correction dot pattern which are required for correcting line width depending upon the condition of line.
Figure 5E:
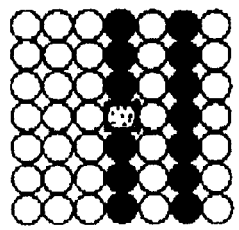
Figure 5I:
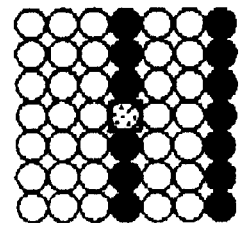
Figure 5B:
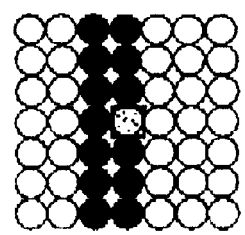
Figure 5F:
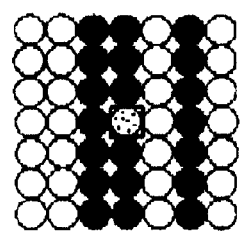
Figure 5J:
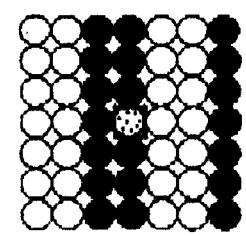
Figure 5C:
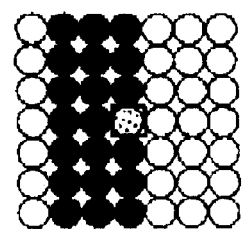
Figure 5G:
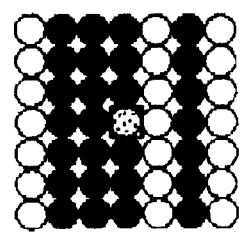
Figure 5K:
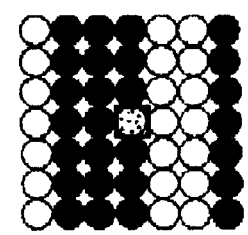
Figure 5D:
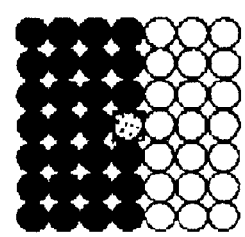
Figure 5H:
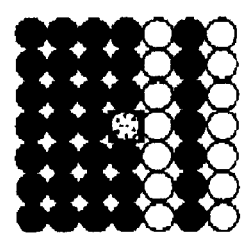
Figure 5L:
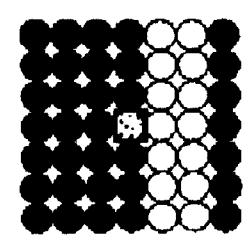
Figure 6:
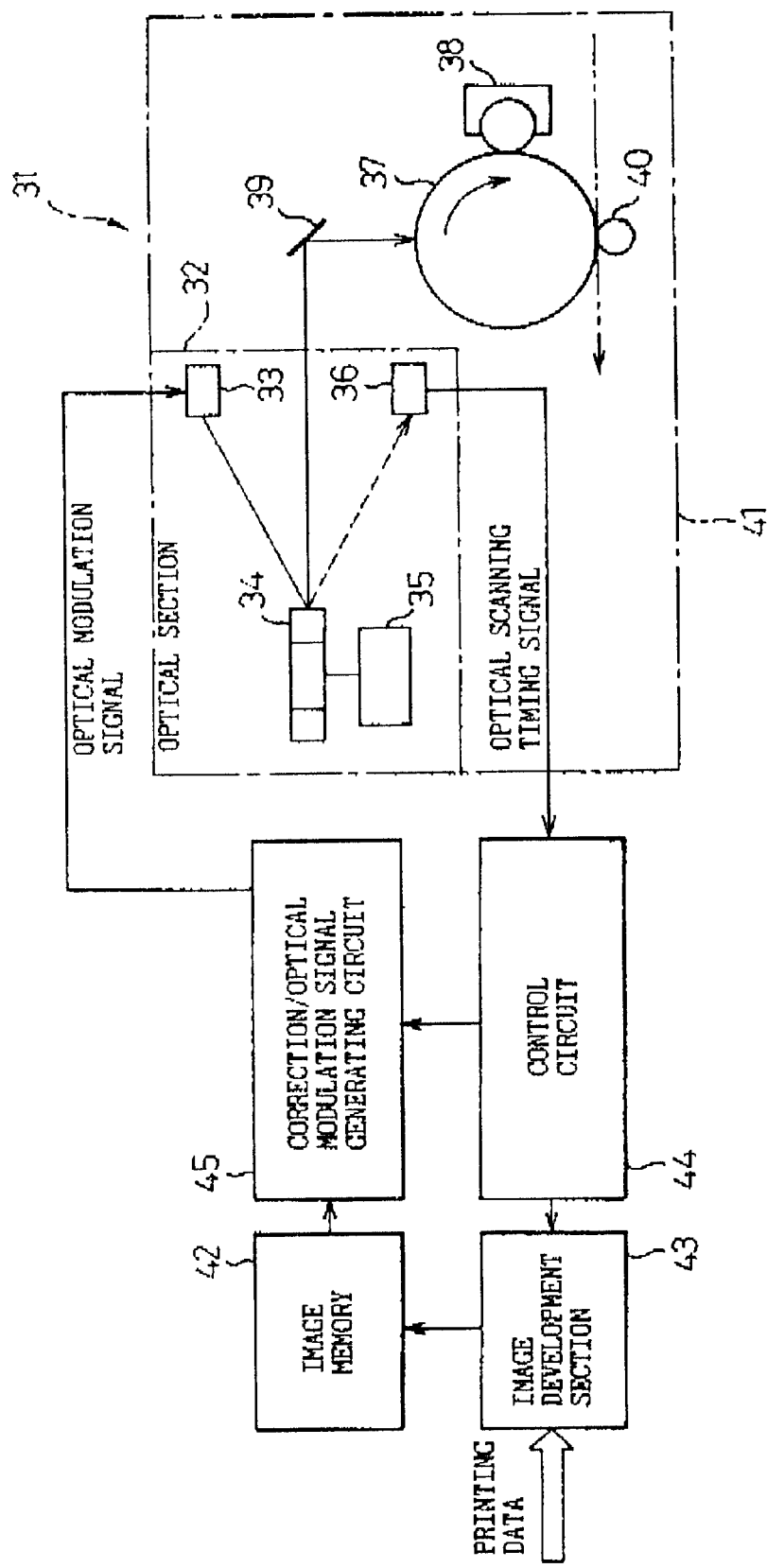
FIG. 6 is a view showing the construction of a laser printer of an embodiment of the present invention.

FIG. 6 is a view showing an example of the construction of a laser beam printer.

Reference number 31 denotes the main body of the laser beam printer. The main body 31 is comprised of an optical section 32 and an image forming section 41. The optical section 32 is comprised of a laser 33 that outputs laser beam, a polygon mirror 34 that deflects the laser beam so as to perform scanning with the beam repeatedly, a mirror motor 35 that drives and rotates the polygon mirror 34, and a beam detector 36 that detects start of scanning of the scanned laser beam. The image is forming section 41 is comprised of a photosensitive drum 37, a development station 38, a transfer roller 40, and a turn-around mirror 39. The surface of the photosensitive drum 37 is electrified with static electric charge using an unshown charger, and is then irradiated with the laser beam. The laser 33 is modulated in synchronism with the scanning of the laser beam and the rotation of the photosensitive drum 37. Thus, the surface of the photosensitive drum 37 is irradiated with an optical image corresponding to the image to be printed. Static electric charge accumulated on the surface of the photosensitive drum 37 decreases in accordance with the amount of irradiation with the laser beam and thereby forms latent image of static electric charge. When charged toner is brought into contact with the surface of the photosensitive drum 37, the toner adheres to the surface in accordance with the latent image of static electric charge on the surface of the photosensitive drum 37, and develops the latent image. A conveyed paper sheet or the like is brought into contact with the surface of the photosensitive drum on which the toner image is formed, and the toner image is transferred to the paper using a transfer roller 40. The transferred toner image is fixed on the paper in a fixing station (not shown) to complete printing. The surface of the photosensitive drum is cleaned after the toner image is transferred, is charged again to repeat the above-described process.

Printing data that are input from a computer system or the like are developed and stored by an image developing section 43 as printing image data in the image memory 42. In general, the image memory 42 is called a bit-map memory and, in the case of binary printing data, each bit of the bit map memory, that is, 1 bit, corresponds to a pixel in the print. A correction/optical modulation signal generating circuit 45 reads out image data stored in the image memory 42 in synchronism with processing in the main body, and generates optical modulation signal and applies it to the laser 33. As described before, by shifting the timing of the optical modulation signal, the printed position of a dot can be shifted in horizontal direction, and by controlling the light emitting duration or intensity of the emitted light, the dot diameter can be changed. The correction/optical modulation signal generating circuit 45 checks the dot pattern of the image data read out from the image memory 42, and performs correction as required.

FIG. 7 is a view showing the construction of the correction/optical modulation signal generating circuit 45. As shown in the Figure, the correction/optical modulation signal generating circuit 45 is comprised of a line buffer 51, a window register 53 that stores the window portion denoted by reference number 52, a first pattern coincidence detection circuit 54 and a second pattern coincidence detection circuit 55 that detect whether or not the dot pattern in the window register 53 coincides with a preset correction dot pattern, a correction data generating table 56 that stores correction data corresponding to the correction dot pattern of the first and second pattern coincidence detection circuits, and outputs the correction data in accordance with the coincidence detection results from the first and second pattern coincidence detection circuits, and an optical modulation signal generating circuit 57 that generates optical modulation signal based on the corrected image data from the correction data generating table 56. The optical modulation signal that is output from the correction/optical modulation signal generating circuit 45 is output to the optical section 32. Further, a control clock signal generating section 58 is provided in the control circuit 44, and the generated clock signal is supplied to each of various sections shown in the Figure. As is evident from the comparison with FIG. 1, the construction is different from the conventional construction in that the first and second pattern coincidence detection circuits are provided, and that the correction data generating table 56 outputs the correction data in accordance with results of the coincidence detection. These differences will be described in detail below.

FIG. 8 is a view showing examples of the shape of windows in the first pattern coincidence detection circuit 54 and the second pattern coincidence detection circuit 55 and illustrating the operation of the correction data generating table 56 for outputting the correction data in accordance with the result of coincidence detection. As shown in the Figure, the window register 53 has a 7×7 dot construction, and contains a one-dot line extending in vertical direction in this case. The windows of the second pattern coincidence detection circuit 55 are composed of 4 windows denoted by reference numbers 62~65, which are windows for detecting line width. The window 62 is a center vertical frame of 1 dot in width, and window 63 is a center horizontal frame of 1 dot in width. The windows 64 and 65 are oblique frames of 1 dot in width and are inclined at 45°. The observation dot is at the center of the window in each case. The first pattern coincidence detection circuit 54 is constructed in the same manner as a conventional coincidence detection circuit. Here, however, only the coincidence of pattern in the window 61 of center vertical frame of 2 dots in width is detected, and dots in the window register 53 other than those in the window 61 are neglected. Thus, number of gates is decreased since gates are not provided for this portion.

When the first pattern coincidence detection circuit 54 detects a coincident correction dot pattern, it sends the data indicating the correction dot pattern to the correction data generating table 56. In this case, right edge of a vertical is detected.

The second pattern coincidence detection circuit 55 detects, for each direction, how many dots from the observation dot are white dots or how many dots are black dots, and sends the detection result to the correction data generating table 56. In this case, it detects that, for window 62, all are black dots, and for windows 63~65, only the observation dot 53A is black and three dots on both sides are all white, and that it is a vertical line with a line width of 1 dot.

Based on the pattern detection result from the first pattern coincidence detection circuit 54 and line width detection result from the second pattern coincidence detection circuit 55, the correction data generating table 56 retrieves corresponding correction data from the table and outputs them. In this case, it is detected that the pattern is an isolated vertical black line of 1 dot in width, and correction data, that the dot diameter is increased by a factor of 1.8 and that shifting is not performed, are output. This is based on the experimental result that, in the case of an isolated line, image quality can be improved by slightly increasing the line width, as will be described later.

FIG. 9 is a case where input data are a vertical black line of 1 dot in width having a jaggy portion at the observation dot, and FIG. 10 is a case where input data are a vertical black line of 2 dots in width having a jaggy portion at the observation dot. In either case, it is detected by the first pattern coincidence detection circuit 54 that input data are a vertical black line having a jaggy portion at the observation dot. Detection results of windows 63~65, however, indicate that, in the case of FIG. 9, line width is 1 dot, and in the case of FIG. 10, line width is 2 dots, Therefore, in the case of FIG. 9, correction data are output such that dot diameter is increased by a factor of 1.8 and the dot position is shifted so as to reduce jaggy, while in the case of FIG. 10, the dot position is also shifted so as to reduce jaggy, but the dot diameter is only slightly increased.

Thus, different correction data are generated for the cases of FIG. 9 and FIG. 10 although the first pattern coincidence detection circuit 54 gives same detection result for the two cases, because the detection result for line width given by the second pattern coincidence detection circuit 55 is different for the two cases, In this way, for patterns that differ in line width, the method of the invention deals with the situation without increasing the number of correction dot patterns of the first pattern coincidence detection circuit 54 and by providing the second pattern coincidence detection circuit 55 and adding correction data for the difference in line width. Therefore, as the number of correction dot pattern needs not be increased in the first pattern coincidence detection circuit 54, an increase in the circuit size of the first pattern coincidence detection circuit 54 can be avoided, and hence an increase in the overall circuit size can be avoided. For example, for 12 patterns in FIG. 5, all the windows of the first pattern coincidence detection circuit 54 can be made common and can be reduced to only one window. Each of the windows of the second pattern coincidence detection circuit 55 for detecting line width is a small window of 1 dot in width, and hence the size of the circuit can be made small. Thus, the overall size of the circuits can be reduced to about 1/10 of the conventional circuits.

A circuit for detecting line width in the second pattern coincidence detection circuit 55 will be described below with reference to FIG. 11. FIG. 11 is a view showing a circuit for detecting line width in the horizontal direction to the right of the observation dot in the horizontal window 63 of FIG. 8, except that the window is 11 dots in length. As shown in the Figure, signal lines 81~86 are provided with each signal line connected to ground via a resistor. The signal line 81 is connected to the power supply line via six transistors with the gate of each transistor connected to a signal line for six dots of the window 63 to the right from the observation dot 53A. Similarly, the signal line 82 is connected to the power supply line via five transistors with the gate of each transistor connected to a signal line for five dots of the window 63 to the right from the observation dot 53A. The same applies in the following, and 4~1 transistors are connected to the signal lines 83~86 with each gate connected to the signal line of the corresponding dot of the window 63.

If all the dots to the right of the observation dot 53A are black (L) in the window 63, all the transistors are turned off and the signal lines 81~86 are all L. From this, it can be determined that line width is not less than 6 dots. If, as shown in the Figure, 5 dots to the right of the observation dot are black (L) but the right-most dot is white (H), the signal line 81 is H since five transistors are off but one transistor is on. Signal lines 82~86 are all L because all the connected transistors are off. Therefore, it can be determined that the line width is 5 dots. Similarly, in any case, the line width in the horizontal direction to the right of the observation dot can be detected.

Using similar circuits for dots to the left of the observation dot 53A, the line width in the horizontal direction to the left of the observation dot can be also detected. The line width can be detected similarly in vertical direction and in two oblique directions, and also for white lines.

The signal for line width can be encoded. For example, with 3 bits, a line width of 0~7 dots can be expressed. Thus, by encoding line width, data length can be reduced, and hence the capacity of the correction data generating table can be reduced. From the type of pattern that has been detected by the first pattern window, it can be determined in which direction line width needs to be considered. For example, if the line has been found to be a vertical line, line width need not be considered in the vertical direction and in the two oblique directions.

Therefore, as shown in FIG. 12, a horizontal line width determination circuit 92 is provided which determines line width in horizontal direction from output of signal lines 81~86 of FIG. 11, and outputs the result of the determination as a 3-bit signal. Similarly, a vertical line width determination circuit 91, a left-rising oblique line width determination circuit 93 that outputs line width signal for an oblique line rising on the left and a right-rising oblique line width determination circuit 94 are provided. The outputs of these circuits are input to a switching circuit 95. The switching circuit 95 outputs the line width signal in the required direction to the correction data generating table 56 in accordance with the switching signal that is output from the first pattern coincidence detection circuit 54 in accordance with the detection result. Thus, a line width signal input to the correction data generating table 56 is only 3 bits, so that capacity of the table may be made small.

In place of various windows of the second pattern coincidence detection circuit 55, a counting circuit may be used to count the number of consecutive white dots or the number of consecutive black dots from the observation dot using a counter. Although this circuit requires time for counting, it has the advantage of making the circuits simple.

Coincidence results of various windows of the second pattern coincidence detection circuit 55 may be input as addresses for the correction data generating table 56. Since this needs no special processing, the processing time can be reduced.

Figure 13A:
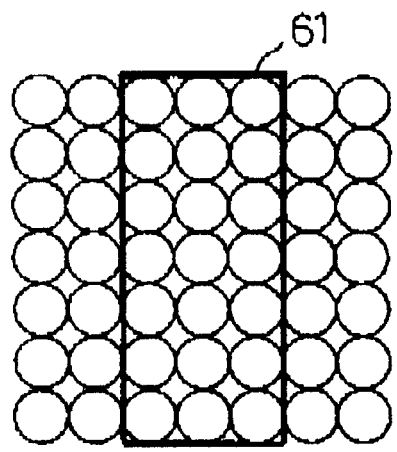
FIGS. 13A to 13D are views showing other examples of a first pattern window in the embodiment.
Figure 13B:
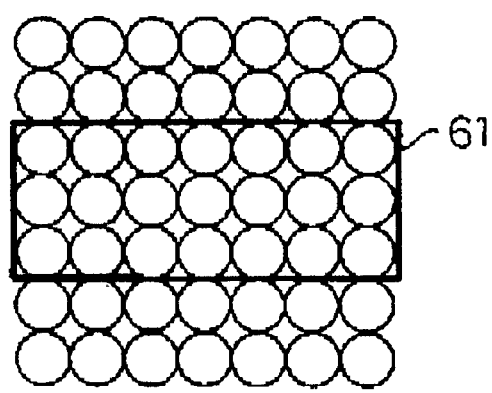
Figure 13C:
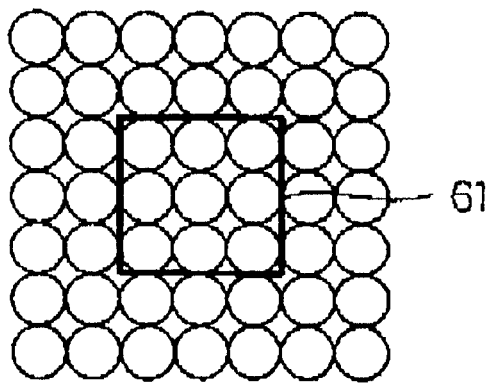
Figure 13D:
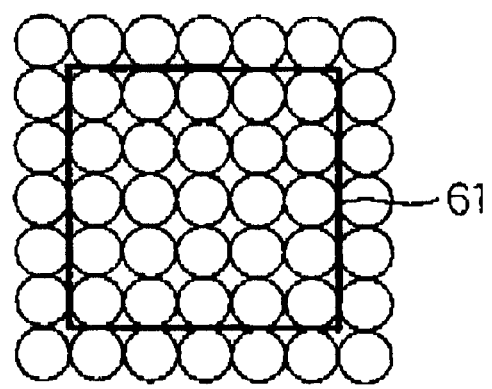

Further, various modification may be made to the shape of the window 61 of the first pattern coincidence detection circuit 54. FIGS. 13A to 13D are views showing examples of such modification. FIG. 13A shows a vertically elongated frame of 3×7, FIG. 13B shows a horizontally elongated frame of 7×3, FIG. 13C shows a smaller square of 3×3, and FIG. 13D shows a slightly smaller square of 5×5.

Figure 14:
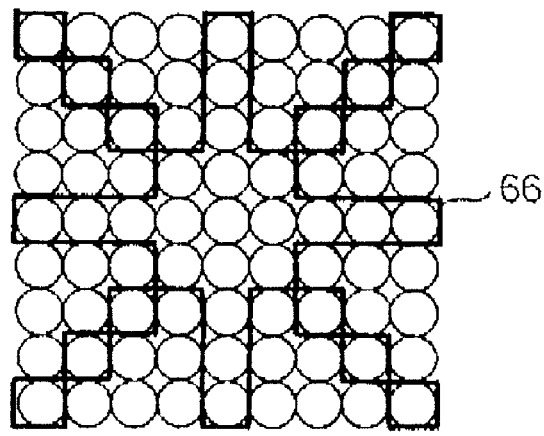
FIG. 14 is a view showing another example of a second pattern window in the embodiment.

Although the second pattern coincidence detection circuit 55 is constructed with 4 windows 62~65, these windows may be combined and used as one window 66 as shown in FIG. 14.

A case where the window register is 7×7 has been explained in the foregoing. If a larger window register is used to distinguish dot patterns more precisely, a greater effect would be obtained from the present invention.

Figure 15:
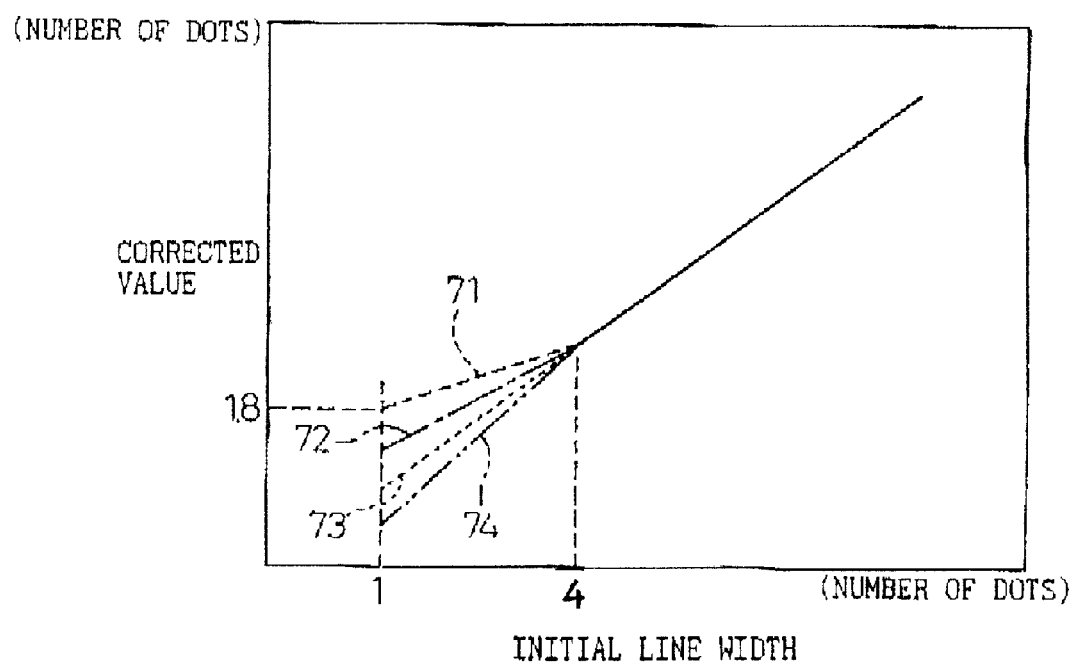
FIG. 15 is a view showing the relation between line width and desirable amount of correction.

FIG. 15 is a view showing the result of a psychological test that has been performed to determine, if an isolated line is printed using a laser printer of 600 dpi, what variation of dot diameter would produce the best visual sensation. If line width is not less than 4 dots, there is no need to correct dot diameter. If line width is equal to or less than 4 dots, dot diameter needs to be corrected. In the case of a single line, for example, dot diameter is changed as indicated by reference number 71, and dot diameter is increased by a factor of 1.8 when line width is 1 dot. In the case of a black line, dot diameter is simply increased to 1.8 times original diameter. In the case of a white line, dot diameter of black dots on both sides of the white line is decreased.

When black lines and white lines are alternatingly arranged and if line width is the same for black line as for white line, dot diameter is maintained as it is as shown by reference number 73. If line width is smaller for a black line than for a white line, the dot diameter of the black dots is slightly increased as shown by reference number 72, and if line width is larger for a black line than for a white line, the dot diameter of black dots is slightly decreased as shown by reference number 74.

In the case of a laser beam printer as shown in FIG. 6, as the relation between pulse width and dot diameter is different depending upon the process condition, it is desirable to set plural conditions for correction of dot diameter so as to be able to fix it to the table after the process condition is decided, or to store plural tables so as to be able to select one. If the process condition changes, the process condition may be detected and the selection of tables may be changed based on the result of the detection.

As has been described in the foregoing, according to the present invention, a dot pattern is detected using windows of different shapes, and the detection results are separately processed and then synthesized so that various patterns can be accurately distinguished using small windows and precise correction can be performed without increasing the size of the circuit. More specifically, pattern information can be acquired by one pattern coincidence detection circuit and line width information can be acquired by the other pattern coincidence detection circuit so that accurate correction may be made to various lines so as to improve the image quality.

Possible Industrial Applications

The present invention can be applied to the correction of image data supplied to an image forming apparatus that forms a dot image so as to improve the quality of the image formed by the image forming apparatus.

What is claimed is:

1. A dot image correcting method comprising the steps of:
   storing correction data corresponding to a correction dot pattern in a window;
   determining whether or not a dot pattern in a window of a dot image coincides with said correction dot pattern; and
   performing correction, when coincidence is detected, in accordance with said corresponding correction data;
   wherein there are a plurality of said windows and said correction data are stored corresponding to a combination of correction dot patterns of various windows;
   and wherein it is determined whether or not dot patterns in said plurality of windows coincide with a combination of correction dot patterns of various windows, and, if coincidence is detected, correction is performed in accordance with said corresponding correction data.

2. A dot image correcting method according to claim 1, wherein each of said plurality of windows includes an observation dot and said correction data are data for correcting said observation dot.

3. A dot image correcting method according to claim 2, wherein said plurality of windows are moved on said dot image such that said observation dot scans said dot image, and it is determined whether or not the dot patterns in said windows coincide with said correction dot patterns.

4. A dot image correcting method according to claim 2, wherein said plurality of windows includes:
   two windows of 1 dot in width including said observation dot and extending in the horizontal direction and in the vertical direction, respectively; and
   two windows of 1 dot in width including said observation dot and extending in each of two directions inclined at 45° relative to said horizontal direction, respectively.

5. A dot image correcting method according to claim 2, wherein one of said plurality of windows includes:
   two dot-lines including said observation dot and extending in the horizontal direction and in the vertical direction, and two dot-lines including said observation dot and extending in two directions inclined at 45° relative to said horizontal direction.

6. A dot image correcting apparatus comprising:
   a correction data storage circuit that stores correction data corresponding to a correction dot pattern in a window;
   a pattern coincidence detection circuit that detects whether or not a dot pattern in a window of a dot image coincides with said correction dot pattern; and
   a correction signal generating circuit that performs correction, when coincidence is detected, in accordance with said corresponding correction data;
   wherein there are a plurality of said windows and said correction data storage circuit stores said correction data corresponding to a combination of correction dot patterns of various windows;
   and wherein said pattern coincidence detection circuit includes a plurality of pattern coincidence detection circuits that detect whether or not dot patterns in said plurality of windows coincide with a combination of correction dot patterns of various windows.

7. A dot image correcting apparatus according to claim 6, wherein each of said plurality of windows includes a common observation dot and said correction data are data for correcting said observation dot.

8. A dot image correcting apparatus according to claim 7, further comprising:
   a line buffer that temporarily stores image data of said dot image in a wider range than the width of said windows; and
   a window register that supplies said dot pattern in said window register to said plurality of pattern coincidence detection circuits such that said observation dot scans said dot image.

9. A dot image correcting apparatus according to claim 7, wherein said plurality of windows includes:
   two windows of 1 dot in width including said observation dot and extending in the horizontal direction and in the vertical direction; and
   two windows of 1 dot in width including said observation dot and extending in directions inclined at 45° relative to said horizontal direction.

10. A dot image correcting apparatus according to claim 7, wherein one of said plurality of windows includes:
    two dot lines including said observation dot and extending in the horizontal direction and in the vertical direction, and two dot lines including said observation dot and extending in two directions inclined at 45° relative to said horizontal direction.

* * * * *